(12) United States Patent
Hjertberg et al.

(10) Patent No.: US 9,343,198 B2
(45) Date of Patent: May 17, 2016

(54) POLYOLEFIN COMPOSITION FOR MEDIUM/HIGH/EXTRA HIGH VOLTAGE CABLES WITH IMPROVED ELECTRICAL BREAKDOWN STRENGTH

(71) Applicants: Thomas Hjertberg, Kungshamn (SE); Villgot Englund, Göteborg (SE)

(72) Inventors: Thomas Hjertberg, Kungshamn (SE); Villgot Englund, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 115 days.

(21) Appl. No.: 13/959,019

(22) Filed: Aug. 5, 2013

(65) Prior Publication Data

US 2013/0341066 A1 Dec. 26, 2013

Related U.S. Application Data

(63) Continuation of application No. 12/809,990, filed as application No. PCT/EP2008/010913 on Dec. 19, 2008, now Pat. No. 8,519,037.

(30) Foreign Application Priority Data

Dec. 21, 2007 (EP) .................................... 07024964

(51) Int. Cl.
  *C08K 5/16* (2006.01)
  *H01B 3/30* (2006.01)
  *C08K 5/00* (2006.01)
  *C08K 5/06* (2006.01)
  *H01B 3/44* (2006.01)

(52) U.S. Cl.
  CPC .............. *H01B 3/307* (2013.01); *C08K 5/0008* (2013.01); *C08K 5/06* (2013.01); *H01B 3/441* (2013.01)

(58) Field of Classification Search
  CPC .............................. C08K 5/0008; C08L 23/02
  See application file for complete search history.

(56) References Cited

U.S. PATENT DOCUMENTS

| 4,216,101 A | * | 8/1980 | Davis ....................... C08K 5/23 252/581 |
| 6,063,845 A | | 5/2000 | Nylander |

FOREIGN PATENT DOCUMENTS

| EP | 1731564 A | 12/2006 |
| WO | 9931675 | 6/1999 |

OTHER PUBLICATIONS

Yamano, Y. Roles of Polycyclic Compounds in Increasing Breakdown Strength of LDEP Film; IEEE Transactions on Dielectrics and Electrical Insulation. 2006; 13(4): 776-781.
Yeung, C.K. et al. Synthesis and properties of 9, 10-dialkoxyanthracenes as fluorescent probes specific of polyolefins and their application to orientation measurement in polyethylene, Makromol. Chem. 185, 541-548 (1984).

* cited by examiner

*Primary Examiner* — Wenwen Cai
(74) *Attorney, Agent, or Firm* — Milbank, Tweed, Hadley & McCloy LLP

(57) ABSTRACT

This application relates to a polyolefin composition comprising a polyolefin and an aromatic compound. The polyolefin composition can be used in producing medium and high voltage cables with improved electrical breakdown strength.

10 Claims, 6 Drawing Sheets

Figure 1:
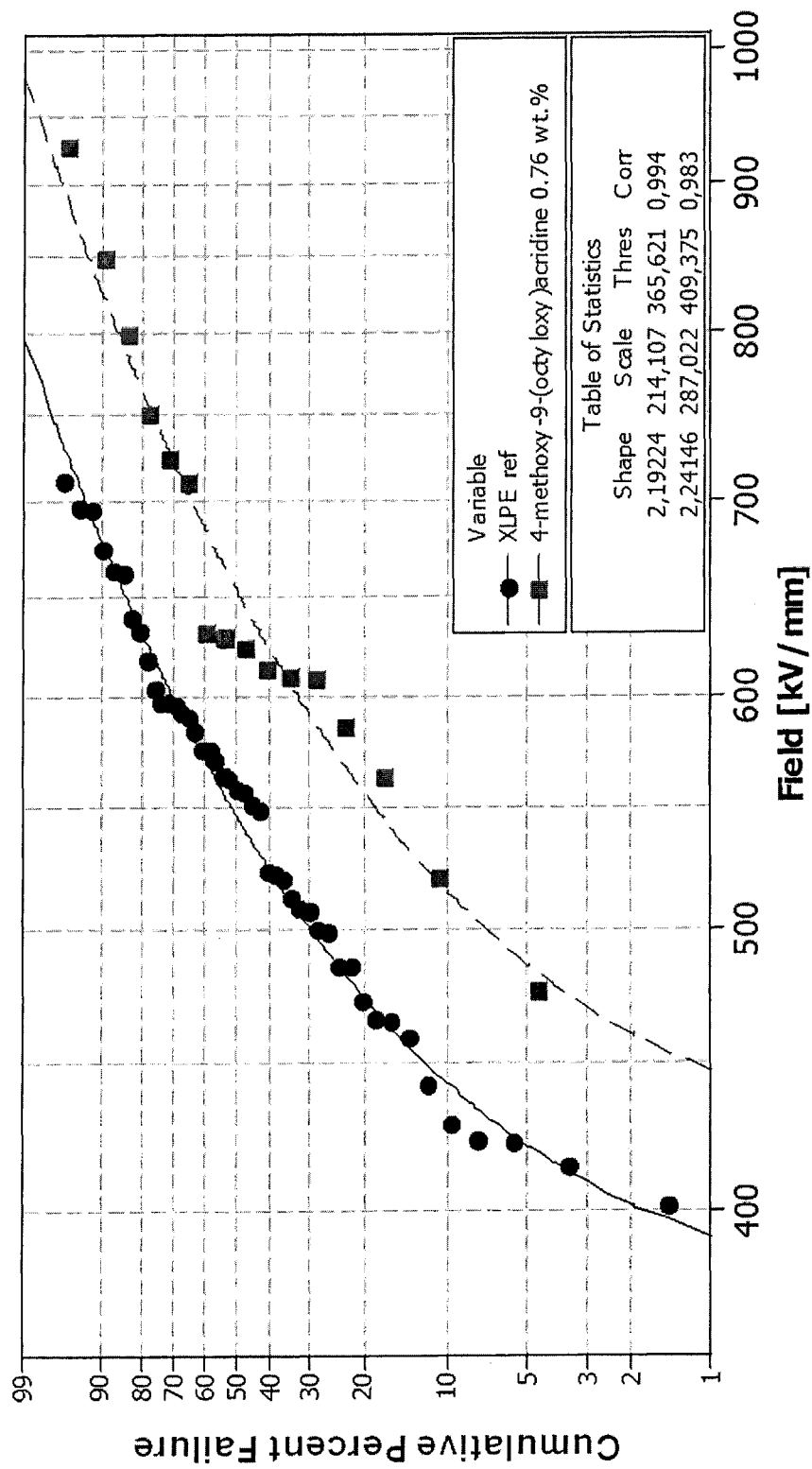

Probability Plot for XLPE ref; 1,5-Dioctyloxynaphthalene 2 wt.%
3-Parameter Weibull

POLYOLEFIN COMPOSITION FOR MEDIUM/HIGH/EXTRA HIGH VOLTAGE CABLES WITH IMPROVED ELECTRICAL BREAKDOWN STRENGTH

This application is a Continuation of U.S. patent application Ser. No. 12/809,990, filed Jun. 21, 2010, which claims priority to International Application No. PCT/EP2008/010913, filed Dec. 19, 2008, which claims priority to European Patent Application No. 07024964.4, filed on Dec. 21, 2007, the disclosures of which are herein incorporated by reference in their entireties.

The present invention relates to a polyolefin composition comprising a polyolefin with improved electrical breakdown strength, to a wire or cable, in particular a medium, high or extra high voltage cable, comprising such a composition, and to the use of such a composition for the production of a wire or cable, in particular a medium, high or extra high voltage cable.

A typical medium voltage power cable, usually used for voltages from 6 to 36 kV, a typical high voltage cable used for voltages higher than 36 kV, and a typical extra high voltage cable used for voltages higher than 170 kV, comprises one or more conductors in a cable core that is surrounded by several layers of polymeric materials, including an inner semiconducting layer, followed by an insulating layer, and then an outer semiconducting layer. These layers are normally cross-linked. To these layers, further layers may be added, such as a metallic tape or wire shield, and, finally, outermost jacketing layer(s). The layers of the cable are based on different types of polymer compositions. As insulating materials, today cross-linked polyolefins like cross-linked low density polyethylene are predominantly used.

It is a constant aim of cable manufacturers to increase the electrical breakdown strength of cable materials, in particular cable insulation materials, in order to achieve greater reliability and increasing energy transmission. To attain this aim, it is known to reduce the amount of contaminants in the insulation material. However, nowadays already super clean materials are used for insulation, and improvements in electrical breakdown strength by further reduction of contaminants are associated with a significant increase in cost.

It is furthermore known to use active additives, namely so called voltage stabilisers, in order to increase the electrical breakdown strength of cable insulation materials. For example, in U.S. Pat. No. 3,482,033 it is disclosed to use a blend of non-volatile hydrocarbon oil of high aromatic content or a highly aromatic, low melting hydrocarbon together with active voltage stabilisers such as polyhalopolyphenyls or nitro-group containing aromatics.

Furthermore, voltage stabilisers are known from WO 01/08166. In this document, stabilisers based on benzophenone as core molecule substituted with alkoxy and phenoxy groups are disclosed.

However, there is still the need for voltage stabilisers which improve the electrical breakdown strength of polyolefin compositions used for medium/high voltage cable isolation. Such compounds should usually have a low ionisation potential to decrease the energy of high energy electrons and hence increase the electrical breakdown strength efficiently (see e.g. A. C. Ashcraft, R. M. Eichhorn, and S. R. G., "Laboratory Studies of Treeing in Solid Dielectrics and Voltage Stabilization of Polyethylene" presented as I.E.E.E. International Symposium on Electrical Insulation, Montreal, Canada, 1978).

At the same time, the compounds must be soluble in the polyolefin, usually cross-linked polyethylene, used as a matrix polymer in the composition, and, furthermore, must show low migration tendency, so that the loss of the compound in the insulation material with time is as low as possible.

Still further, as usually insulating compositions are cross-linked polyolefins, the stabiliser must as far as possible be compatible to commonly used cross-linking agents, such as organic peroxides, so that, on the one hand, the cross-linking process is not negatively affected, and, on the other hand, the stabiliser is not decomposed and thus inactivated. Of course, the stabiliser should also be compatible in this sense with regard to all other components of the polyolefin composition.

It is thus an object, to provide a stabiliser for improving the electrical breakdown strength of a polyolefin composition, especially for the use as an insulating composition in a medium/high/extra high voltage cable, which has the above-mentioned properties, in particular provides a significant improvement in electrical breakdown strength, has preferably also a good solubility in the polyolefin matrix and a low migration tendency, and more preferably is compatible with regard to other components of the polyolefin composition, in particular to cross-linking agents.

It has now surprisingly been found that the above objects can be achieved by the use of a an organic compound as a voltage stabiliser compound which comprises an aromatic moiety which comprises a naphthyl-group or at least two phenyl-groups which are linked together so that no free rotation of one phenyl group with regard to the other is possible, at said aromatic moiety of the compound there is present at least one hydrocarbyl substituent which may comprise heteroatoms, and the compound having at least one substituent which may comprise heteroatoms and which comprises at least 6 non-H atoms, with any hydrocarbyl substituent which is attached to any aromatic moiety of the compound being free of H-atoms in the alpha-position of the hydrocarbyl substituent.

The present invention therefore provides a polyolefin composition comprising
(i) a polyolefin (A),
(ii) an aromatic compound (B) comprising a, preferably consisting of the, structural unit according to the following formula (I):

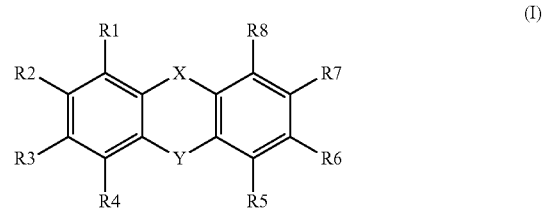

wherein
one or more of the C-atoms in the phenyl rings to which residue R1, R2, R3, R4, R5, R6, R7, or R8 is attached may also be a heteroatom, such as N, in which case the respective residue R1, R2, R3, R4, R5, R6, R7, or R8 is not present;
X either is no atom so that there is a direct bond between the two phenyl rings, or is =C(R11)-, —C(R11)$_2$-, —C(=Z)—, =N— or —N(R12)-,
Y either is no atom so that there is a direct bond between the two phenyl rings, or is =C(R13)-, —C(R13)$_2$-, —C(=Z)—, =N— or —N(R14)-,
Z is a divalent atom such as O, R1, R2, R3, R4, R5, R6, R7, R8 and, if present, R11, R12, R13 and R14 independently are hydrogen, or a hydrocarbyl group which may contain heteroatoms;

or at least two of said R1, R2, R3, R4, R5, R6, R7, R8 or, if present, R11, R12, R13 or R14, together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R8;

with the provisios that
(i) at least one of said R1, R2, R3, R4, R5, R6, R7 or R8, or if present, at least one of said R1' to R8', is a hydrocarbyl group which may contain hetero atoms; and
(ii) at least one of said R1, R2, R3, R4, R5, R6, R7 or R8, or, if present, said R1' to R8', R11, R12, R13 or R14, is a hydrocarbyl group which may contain heteroatoms and which has at least 6 non-H atoms;
(iii) if any of said R1, R2, R3, R4, R5, R6, R7 or R8, and, if present, any of said R1' to R8', R11, R12, R13 or R14 is a hydrocarbyl group which may contain hetero atoms, is attached to an aromatic ring of the compound according to formula (I), said hydrocarbyl group must be free of H-atoms in the alpha-position;
and/or an aromatic compound with a, preferably consisting of the, structural unit according to the following formula (II):

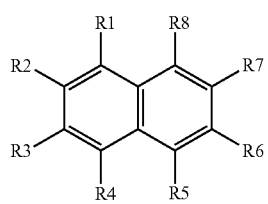

(II)

wherein
one or more of the C-atoms in the naphtyl rings to which residue R1, R2, R3, R4, R5, R6, R7, or R8 is attached may also be a trivalent heteroatom such as N, in which case the respective residue R1, R2, R3, R4, R5, R6, R7, or R8 is not present;
or at least two of said R1, R2, R3, R4, R5, R6, R7 or R8, together with the ring atoms of the ring system of formula (II) they are attached to, form a further aromatic or non-aromatic ring fused to the ring system of formula (II), and wherein the ring system of formula (II) with said at least one fused further ring may further bear one to eight substituents R1' to R8';
and R1, R2, R3, R4, R5, R6, R7 and R8, and, if present, said R1' to R8', have the same meaning and fulfil the same provisios as indicated for formula (I).

The possible substituents X and Y in formula (I) inter alia define compounds in which the aromatic system extends from the phenyl ring with substituents R1 to R4 (the first phenyl ring) to the phenyl ring with substituents R5 to R8 (the second phenyl ring). These compounds together with the naphthalene compounds defined above are preferred embodiments in the present invention. For example, the compound of formula (I) may be an anthracene derivative, where X is =C(R11)- and Y is =C(R13)-, a carbazole derivative, where X is —N(R12)- and Y is no atom, or an acridine derivative, where X is =C(R11)- and Y is =N—.

However, the substituents X and Y in formula (I) also define compounds in which the aromatic system does not extend from the first phenyl ring to the second phenyl ring. For example, the compound of formula (II) may be an anthrachinone derivative, where both X and Y are —C(=O)— groups.

Furthermore, in formula (I) and (II) any of R1, R2, R3, R4, R5, R6, R7 and R8 and, if present, R11, R12, R13, and R14 may also form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R8. For example, R2 and R3 in formula (II) may form a —CR1'=CR2'-CR3'=CR4'- group, so that an anthracene derivative is obtained.

The term "hydrocarbyl group" denotes any substituent which is composed of carbon and hydrogen atoms regardless of the degree of saturation, e.g. alkyl groups, alkenyl groups, alkinyl groups and aromatic groups composed of C and H. Where it is indicated that a hydrocarbyl group may contain heteroatoms these are atoms different from C and H, such as Si, N, P, O or S, typically N or O.

The term "hydrocarbyl group must be free of H-atoms in the alpha-position" means herein that the atom of the hydrocarbyl group which is directly linked to an aromatic moiety of the compound according to formula (I) or (II) does not bear H-atoms.

It has been found that the use of the above compounds as stabiliser yields insulating polyolefin compositions with significantly improved electrical breakdown strength. The improvement in electrical breakdown strength can be seen from the high values of the molar field stability as measured hereinafter. Furthermore, the compounds have a good solubility in the polyolefin matrix and a low migration tendency, and are inert with regard to other components of the polyolefin composition, in particular to cross-linking agents.

In an preferred embodiment said at least one of said R1, R2, R3, R4, R5, R6, R7 or R8, or, if present, said R1' to R8', R11, R12, R13 or R14 mentioned in provisio (ii) to be a hydrocarbyl group which may contain heteroatoms and which has at least 6 non-H atoms is selected from —O(R9), —N(R10)$_2$, wherein R9 and R10 independently are hydrocarbyl groups having at least 5 non-H-atoms.

In another preferred embodiment said at least one of said R1, R2, R3, R4, R5, R6, R7 or R8, or, if present, said R1' to R8', R11, R12, R13 or R14 mentioned in provisio (ii) to be a hydrocarbyl group which may contain heteroatoms and which has at least 6 non-H atoms, is an aromatic group having at least 6 non-H-atoms and, preferably, contains a substituent, i.e. the substituent is present at the aromatic group, which is a hydrocarbyl group which may contain heteroatoms.

More preferably, said substituent is selected from the groups of —O(R9), —N(R10)$_2$, wherein R9 and R10 are hydrocarbyl groups.

Preferably, in all embodiments the hydrocarbyl group mentioned in provisio (ii) which may contain heteroatoms comprises at least 7 non-H atoms, and more preferably comprises at least 9 non-H atoms.

Preferably, in the compounds with the structural units according to formula (I) or (II) all atoms in the phenyl or naphthyl rings to which a residue R1 to R8 is attached are C-atoms.

It is furthermore preferred that R9 and R10 and, if present, R11, R12, R13 and R14, independently are a hydrocarbyl group which may contain heteroatoms and has at least 6 carbon atoms, more preferably has 7 carbon atoms, still more preferably at least 8 carbon atoms and even more preferably 9 carbon atoms.

Furthermore, preferably, R9 and R10 and, if present, R12 and R14, independently are an alkyl group, more preferably a straight alkyl group, with at least 6 C-atoms, more preferably with at least 7 C-atoms, still more preferably at least 8 C-atoms, and most preferably at least 9 C-atoms, which may or may not contain a functional group at the end, which, if present, preferably is a —CH=CH$_2$, a halogen, a hydroxyl, carboxylic acid or acid halide group.

Furthermore, preferably the compounds having a structural unit according to formula (I) or (II) are free of halogen substituents or substituents containing halogen atoms.

It is furthermore preferred that in the structural units according to formula (I) or (II) at least two hydrocarbyl groups as R1 to R8, or if present, R11, R12, R13, and R14, which may contain heteroatoms, are present in any of their embodiments described before.

In such cases it is preferred that said two hydrocarbyl groups are separated by at least two further ring atoms, e.g. are in para position if the two groups are linked to the same phenyl group.

In a first preferred embodiment, the aromatic compound (B) has a structural unit in which in formula (I) X is =C(R11)-, and Y is =N—, so that the compound is an acridine derivative having the following structural unit:

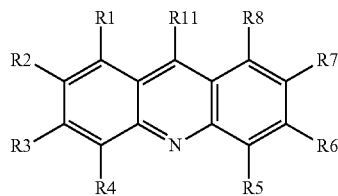

wherein R1, R2, R3, R4, R5, R6, R7, R8, and R11 have the meaning as defined in any of the embodiments above.

In this first embodiment, it is preferred that two of R1, R2, R3, R4, R5, R6, R7, R8, and/or R11 independently are selected from the groups of —O(R9) and —N(R10)$_2$, and the remainder of R1, R2, R3, R4, R5, R6, R7, R8, and/or R11 are —H, wherein R9 and R10 have the meaning as defined in any of the embodiments above.

More preferably, the two of R1, R2, R3, R4, R5, R6, R7, R8, and/or R11 which are not —H are connected to C-atoms which are separated by at least two further ring atoms of the acridine ring system, for example R1 and R4 are —O(R9), and R2, R3, R5, R6, R7, R8 and R11 are —H.

In this first embodiment, it is especially preferred that R5 and R11 independently are —O(R9) or —N(R10)$_2$, more preferably —O(R9), and R1, R2, R3, R4, R6, R7, and R8 are —H; or that R3 and R6 independently are —O(R9) or —N(R10)$_2$, more preferably —N(R10)$_2$, and R1, R2, R4, R4, R5, R7, R8, and R11 are —H.

An example for and a preferred embodiment of the aromatic compound (B) of the first preferred embodiment is 4-methoxy-9-(octyloxy)acridine.

In a second preferred embodiment, the aromatic compound (B) has a structural unit in which in formula (I) X is =C(R11)- and Y is =C(R13)-, so that the compound is a anthracene derivative having the following structural unit:

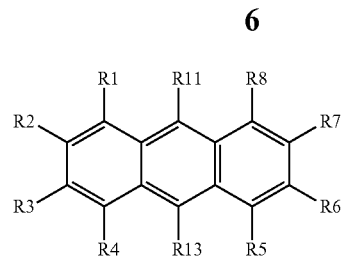

wherein R1, R2, R3, R4, R5, R6, R7, R8, R11 and R13 have the meaning as defined in any of the embodiments above.

In this second embodiment, it is preferred that two of R1, R2, R3, R4, R5, R6, R7, R8, R11 and/or R13 independently are selected from the groups of —O(R9) and —N(R10)$_2$, and the remainder of R1, R2, R3, R4, R5, R6, R7, R8, R11 and/or R13 are —H, wherein R9 and R10 have the meaning as defined in any of the embodiments above.

More preferably, the two of R1, R2, R3, R4, R5, R6, R7, R8, R11 and/or R13 which are not —H are connected to C-atoms which are separated by at least two further ring atoms of the anthracene ring system, for example R1 and R4 are —O(R9) and R2, R3, R5, R6, R7, R8, R11 and R13 are —H.

In this second embodiment, it is especially preferred that R11 and R13 independently are —O(R9) or —N(R10)$_2$, more preferably —O(R9), and R1, R2, R3, R4, R5, R6, R7, and R8 are —H.

An example for and a preferred embodiment of the aromatic compound (B) of the second embodiment is 9,10-dioctyloxyanthracene.

In a third preferred embodiment, the aromatic compound (B) has a structural unit in which in formula (I) X is —C(=O)— and Y is —(C=O)— so that the compound is a anthrachinone derivative having the following structural unit:

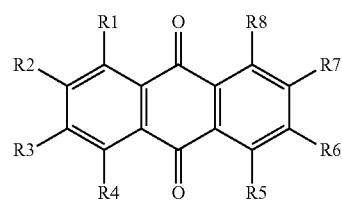

wherein R1, R2, R3, R4, R5, R6, R7, and R8 have the meaning as defined in any of the embodiments above.

In this third embodiment, it is preferred that two of R1, R2, R3, R4, R5, R6, R7, and/or R8 independently are selected from the groups of —O(R9) and —N(R10)$_2$, and the remainder of R1, R2, R3, R4, R5, R6, R7, and R8 are H, wherein R9 and R10 have the meaning as defined in any of the embodiments above.

More preferably, the two of R1, R2, R3, R4, R5, R6, R7, and/or R8 which are not —H are connected to C-atoms which are separated by at least two further ring atoms of the anthrachinone ring system, for example R1 and R4 are —O(R9) and R2, R3, R5, R6, R7, and R8 are —H.

In this third embodiment, it is especially preferred that R1 and R4 independently are —O(R9) or —N(R10)$_2$, more preferably —O(R9), and R2, R3, R5, R6, R7, and R8 are —H.

In a fourth preferred embodiment, the aromatic compound (B) has a structural unit in which in formula (I) X is —N(R12)- and Y is not an atom so that the compound is a carbazole derivative having the following structural unit:

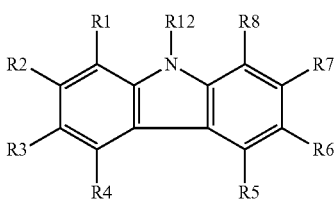

wherein R1, R2, R3, R4, R5, R6, R7, R8, and R12 have the meaning as defined in any of the embodiments above.

In this fourth embodiment, it is preferred that two of R1, R2, R3, R4, R5, R6, R7, and/or R8 independently are selected from the groups of —O(R9) and —N(R10)$_2$ or an aromatic group, preferably a phenyl group, which is at least substituted by at least one, more preferably one, —O(R9) or —N(R10)$_2$ group, with the substitution preferably being in a position so that the atom of the aromatic group connected to the carbazole body and the atom to which the —O(R9) or —N(R10)$_2$ group is attached are separated by at least two further ring atoms, e.g. are in para position if the aromatic group is a phenyl group, R9 and R10 have the meaning as defined in any embodiment above, and the remainder of R1, R2, R3, R4, R5, R6, R7, and R8 are —H.

Furthermore, R12 preferably is an alkyl group, preferably a straight alkyl group, and preferably has 1 to 50 carbon atoms, more preferably has 1 to 30 carbon atoms, still more preferably has 6 to 30 C-atoms, and still more preferably has 8 to 30 C-atoms.

More preferably, the two of R1, R2, R3, R4, R5, R6, R7, and/or R8 which are not —H are connected to C-atoms which are separated by at least two further ring atoms of the carbazol ring system, for example R1 and R4 are —O(R9) and R2, R3, R5, R6, R7, and R8 are —H.

In this fourth embodiment, it is especially preferred that R3 and R6 independently are an aromatic group, preferably a phenyl group, which is at least substituted by at least one, more preferably one, —O(R9) or —N(R10)$_2$ group, with the substitution preferably being in a position so that the atom of the aromatic group connected to the carbazol body and the atom to which the —O(R9) or —N(R10)$_2$ group is attached are separated by at least two further C-atoms, e.g. are in para position if the aromatic group is a phenyl group, and R1, R2, R4, R5, R7, and R8 are —H.

An example for and a preferred embodiment of the aromatic compound (B) of the fourth embodiment is 9-octyl-3,6-bis(4-(octyloxy)phenyl)-carbazole.

In a fifth, especially preferred embodiment, the aromatic compound (B) has a structural unit in which in formula (II) two of R1, R2, R3, R4, R5, R6, R7, and/or R8 independently are selected from the groups of —O(R9) and —N(R10)$_2$, and the remainder of R1, R2, R3, R4, R5, R6, R7, and/or R8 are —H, wherein R9 and R10 have the meaning as defined in any of the embodiments above.

More preferably, the two of R1, R2, R3, R4, R5, R6, R7, and/or R8 which are not —H are connected to C-atoms which are separated by at least two further C-atoms of the naphthalene ring system, for example R1 and R4 are —O(R9) and R2, R3, R5, R6, R7, and R8 are —H.

In this fifth embodiment, it is especially preferred that R1 and R5 independently are —O(R9) or —N(R10)$_2$, and R2, R3, R4, R6, R7, and R8-H.

An example for and a preferred embodiment of the aromatic compound (B) of the fifth embodiment are 1,5-dioctyloxynaphthalene or N1,N1,N5,N5-tetraoctylnaphthalene-1,5-diamine, with N1,N1,N5,N5-tetraoctylnaphthalene-1,5-diamine being an especially preferred embodiment.

It is preferred that in all of the above embodiments the aromatic compound (B) consists of the structural unit described for the particular embodiment. However, for all cases where the aromatic system(s) of formula (I) or (II) contain at least two substituents, it is also possible that structural units of any of the above described embodiments are made into oligomeric structures, to increase the molecular weight.

For example, such an oligomeric compound based on 1,5-dihydrocarbyloxynaphthalene as a structural unit would be

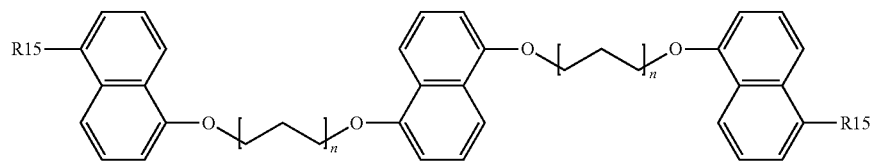

wherein R15 is an O(R9) group in any of the embodiments described above.

For example, in the case R15 is an n-octyloxy group and n=8 the compound would be the trimer of 1,5-dioctyloxynaphthalene.

It is furthermore possible and also within the scope of the invention to attach the aromatic compound (B) to one or more further components of the polyolefin composition of the invention, e.g. to attach it to polyolefin (A).

This may be done by copolymerising stabiliser-containing comonomers and "regular" monomers of e.g. polyolefin (A), or by grafting of suitable stabiliser compounds onto a polymer backbone.

Preferably, aromatic compound (B) is present in the composition in an amount of 0.001 to 10 wt %, more preferably 0.01 to 5 wt. %, still more preferably from 0.05 to 4 wt. %, and most preferably from 0.1 to 3 wt. %.

Polyolefin (A) may be any polyolefin material suitable to be used for the production of a layer of cable, preferably power cable layer, more preferably an insulation layer of a power cable.

Polyolefin (A) preferably comprises or consists of a polyethylene or polypropylene. Where herein it is referred to a "polymer", e.g. polyethylene, this is intended to mean both homo- and copolymer, e.g. ethylene homo- and copolymer.

Where polyolefin (A) comprises or consists of a polyethylene, the polymer may be produced in a high pressure process or in a low pressure process in the presence of a catalyst, for example a chromium, Ziegler-Natta or single-site catalyst, resulting in either unimodal or multimodal polyethylene.

Where polyolefin (A) comprises or consists of a polypropylene, this may be a unimodal or multimodal propylene homo- or copolymer and/or a heterophasic polypropylene.

Furthermore, where polyolefin (A) comprises or consists of a polypropylene, it is preferred that it has an MFR$_2$ (230° C., 2.16 kg) of from 0.001 to 25 g/10 min.

In a preferred embodiment, polyolefin (A) comprises or consists of an ethylene homo- or copolymer. In the case of an ethylene copolymer, it is preferred that it includes up to 40 wt. %, more preferably 0 to 25 wt.-%, even more preferably 0.1 to 15 wt.-% of one or more comonomers.

Preferably, the density of the ethylene homo or -copolymer is higher than 0.860 g/cm$^3$.

Furthermore, preferably the density of the ethylene homo or -copolymer is not higher than 0.960 g/cm$^3$.

The MFR$_2$ (2.16 kg, 190° C.) of the ethylene homo or -copolymer preferably is from 0.01 to 50 g/10 min, more preferably is from 0.1 to 20 g/10 min, and most preferably is from 0.2 to 10 g/10 min.

Still further, it is preferred that polyolefin (A) comprises or consists of a polyethylene which has been produced by a high pressure process using free radical polymerization resulting in low density polyethylene (LDPE). The polymerization generally is performed at pressures of 120 to 350 MPa and at temperatures of 150 to 350° C.

The LDPE may be an ethylene homopolymer or a copolymer of ethylene.

As a comonomer in the ethylene copolymer, a non-polar alpha-olefin may be used, either alone or in addition with further types of comonomers. Such alpha-olefins may also comprise further unsaturation present e.g. in polyunsaturated comonomers such as dienes.

Preferably, C$_3$ to C$_{10}$ alpha-olefins without further unsaturation are used as comonomers, such as propylene, 1-butene, 1-hexene, 4-methyl-1-pentene, styrene, 1-octene, 1-nonene and/or polyunsaturated comonomer(s) such as C$_8$ to C$_{14}$ non-conjugated dienes, such as a C$_8$ to C$_{14}$ non-conjugated diene, e.g. 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

It is preferred that the LDPE includes 0 to 25 wt.-%, more preferably 0.1 to 15 wt.-% of one or more comonomers.

Polyolefin (A) preferably is cross-linkable. Cross-linking may be achieved e.g. by further including a cross-linking agent into the composition or by the incorporation of cross-linkable groups into polyolefin (A).

In a preferred embodiment, the polymer composition according to the present invention further comprises a cross-linking agent.

In the context of the present invention, a cross-linking agent is defined to be any compound capable to generate radicals which can initiate a cross-linking reaction. Preferably, the cross-linking agent contains at least one —O—O— bond or at least one —N=N— bond. More preferably, the cross-linking agent is a peroxide known in the field.

The cross-linking agent, e.g. a peroxide, is preferably added in an amount of less than 10 wt %, more preferably 0.1 to 5.0 wt. %, still more preferably 0.1 to 3.0 wt. %, even more preferably 0.15 to 2.6 wt. %, based on the weight of the cross-linkable polymer composition.

As peroxides as non-limiting examples of cross-linking agents are i.a. di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl) benzene, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert-butylperoxyisopropyl)benzene, 2,5-dimethyl-2,5-di(benzoylperoxy)hexane, 1,1-di(tert-butylperoxy) cyclohexane, 1,1-di(tert amylperoxy)cyclohexane, or any mixtures thereof.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

It is preferred that cross-linking is effected by including a cross-linking agent, such as a peroxide in any of the above mentioned embodiments, into the composition.

However, cross-linking may also be achieved by hydrolysable silane groups which may be present in polyolefin (A). Thus, polyolefin (A) may also comprise or consist of a cross-linkable polyolefin containing hydrolysable silane groups.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

In an especially preferred embodiment, polyolefin (A) comprises or consists of an unsaturated polyolefin, i.e. a polyolefin comprising carbon-carbon double bonds, more preferably a polyolefin having a total amount of carbon-carbon double bonds/1000 carbon atoms of 0.1 or more, more preferably of 0.2 or more, and most preferably more than 0.37.

When used in combination with the unsaturated polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds within the polyolefin component enables to accomplish improved cross-linking properties.

The total amount of vinyl groups is preferably higher than 0.02/1000 carbon atoms, more preferably higher than 0.05/1000 carbon atoms, still more preferably higher than 0.08/1000 carbon atoms, and most preferably higher than 0.11/1000 carbon atoms.

The polyolefin can be unimodal or multimodal, e.g. bimodal.

In the present invention, the polyolefin is preferably unsaturated polyolefin, more preferably an unsaturated polyethylene or an unsaturated polypropylene. Most preferably, the unsaturated polyolefin is an unsaturated polyethylene.

In a preferred embodiment, the polyolefin (A) as polyethylene or the preferably unsaturated polyethylene contains at least 60 wt-% ethylene monomer units. In other preferred embodiments, the unsaturated polyethylene contains at least 70 wt-%, or at least 80 wt-% ethylene monomer units.

Polyethylene, or preferably unsaturated polyethylene, of low density is preferred.

Preferably, the unsaturated polyolefin is prepared by copolymerising at least one olefin monomer with at least one polyunsaturated comonomer.

In a preferred embodiment, the polyunsaturated comonomer consists of a straight carbon chain with at least 8 carbon atoms and at least 4 carbon atoms between the non-conjugated double bonds, of which at least one is terminal.

Ethylene and propylene are preferred olefin monomers. Most preferably, ethylene is used as the olefin monomer.

As a comonomer, a diene compound is preferred, more preferably a C$_8$ to C$_{14}$ non-conjugated diene, e.g. 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

Siloxanes having the following formula:

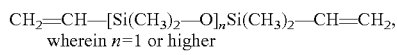

wherein n=1 or higher can also be used as a polyunsaturated comonomer. As an example, divinylsiloxanes, e.g. α,ω-divinylsiloxane, can be mentioned.

In addition to the polyunsaturated comonomer, further comonomers can optionally be used, preferably $C_3$ to $C_{10}$ alpha-olefin comonomers without further unsaturation, such as propylene, 1-butene, 1-hexene, 4-methyl-1-pentene, styrene, 1-octene, and/or 1-nonene.

Polyolefin (A) may comprise polar comonomers alternatively or in addition to non-polar alpha-olefins. Preferably, as polar monomer units, compounds containing hydroxyl groups, alkoxy groups, carbonyl groups, carboxyl groups and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

When preparing the unsaturated polyolefin such as an unsaturated polyethylene in a high pressure process, the polymerisation is generally performed at pressures in the range of 120 to 350 MPa and at temperatures in the range of 150 to 350° C.

In addition to the components polyolefin (A) and aromatic compound (B), the polymer composition may further comprise components, which may, for example, be any type of other polymer.

In one embodiment, the polymer composition of the invention further comprises a polar copolymer (C).

Polar copolymers (C) preferably are olefin copolymers, more preferably propylene or ethylene copolymers.

Preferably, the polymer composition further comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing cross-linking performance during the cross-linking step.

Preferably, the scorch retarder is selected from 2,4-diphenyl-4-methyl-1-pentene, substituted or unsubstituted diphenylethylene, quinone derivatives, hydroquinone derivatives, monofunctional vinyl containing esters and ethers, or mixtures thereof. More preferably, the scorch retarder is selected from 2,4-diphenyl-4-methyl-1-pentene, substituted or unsubstituted diphenylethylene, or mixtures thereof. Most preferably, the scorch retarder is 2,4-diphenyl-4-methyl-1-pentene.

Preferably, the amount of scorch retarder is within the range of 0.005 to 1.0 wt.-%, more preferably within the range of 0.01 to 0.8 wt.-%, based on the weight of the cross-linkable polyolefin composition. Further preferred ranges are 0.03 to 0.75 wt.-%, 0.05 to 0.70 wt.-% and 0.07 to 0.50 wt.-%, based on the weight of the cross-linkable polyolefin composition.

The polymer composition may contain further additives, such as antioxidants, stabilisers, processing aids, and/or cross-linking boosters. As antioxidant, sterically hindered or semi-hindered phenols, aromatic amines, aliphatic sterically hindered amines, organic phosphates, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As further additives, flame retardant additives, acid scavengers, inorganic fillers, water-tree retardant additives and other voltage stabilizers can be mentioned.

If an antioxidant, optionally a mixture of two or more antioxidants, is used, the added amount can range from 0.005 to 2.5 wt.-%, based on the weight of the polymer composition.

In general, if a polyethylene is used in the composition, the antioxidant(s) are preferably added in an amount of 0.005 to 1.0 wt.-%, more preferably 0.01 to 0.80 wt.-%, even more preferably 0.05 to 0.60 wt.-%, based on the weight of the polymer composition.

Similarly, if a polypropylene is used in the composition, the antioxidant(s) are preferably added in an amount of 0.005 to 2 wt.-%, more preferably 0.01 to 1.5 wt.-%, even more preferably 0.05 to 1 wt.-%, based on the weight of the polymer composition.

Further additives may be present in an amount of 0.001 to 5 wt.-%, more preferably 0.005 to 3 wt.-%, and still more preferably 0.005 to 2 wt.-%, based on the weight of the polymer composition. Flame retardant additives and inorganic fillers can be added in higher amounts.

If used for semiconductive layers, the composition may comprise carbon black in usual amounts, preferably in an amount of from 20 to 60 wt.-%, more preferably from 30 to 50 wt.-%.

The $MFR_2$ (2.16 kg, 190° C.) of the polymer composition for other than semiconductor material preferably is from 0.01 to 50 g/10 min, more preferably is from 0.1 to 20 g/10 min, and most preferably is from 0.2 to 10 g/10 min.

The polyolefin (A) and the aromatic compound (B), optionally in combination with one or more optional additives discussed above, can be blended by any conventional blending technique to result in the polymer composition of the invention.

Where the polymer composition contains an unsaturated polyolefin as polyolefin (A) then the polymer composition preferably has a total amount of carbon-carbon double bonds/1000 carbon atoms of more than 0.10, more preferably at least 0.20, even more preferably at least 0.30, even more preferably more than 0.35, even more preferably more than 0.40, even more preferably more than 0.45, even more preferably more than 0.50, even more preferably more than 0.55 and most preferably more than 0.60 carbon-carbon double bonds/1000 carbon atoms. The total amount of double bonds of the cross-linkable polymer composition is based on vinyl, vinylidene and trans-vinylene groups/1000 C-atoms of component (A).

Furthermore, it is preferred that the polymer composition has a total amount of vinyl groups/1000 carbon atoms of more than 0.02 and more preferred more than 0.05. It is to be understood that the total amount of vinyl groups in the polymer composition includes also those originating form of the further polymer components, if present. In other preferred embodiments, the polymer composition has a total amount of vinyl groups/1000 carbon atoms of at least 0.02, more preferably of at least 0.05, even more preferably of at least 0.08, even more preferably of at least 0.10, even more preferably of at least 0.15, even more preferably of at least 0.20, even more preferably of at least 0.25, even more preferably of at least 0.30, even more preferably of at least 0.35, even more preferably of at least 0.40, and most preferably of at least 0.45.

From the polymer composition described above, a cross-linked composition can be prepared by blending with a cross-linking agent, followed by treatment under cross-linking conditions, thereby increasing the cross-linking level. Cross-linking can be effected by treatment at increased temperature, e.g. at a temperature of at least 160° C. When peroxides are used, cross-linking is generally initiated by increasing the temperature to the decomposition temperature of the corresponding peroxide. When the peroxide decomposes, radicals are generated from the peroxide. These radicals then initiate the cross-linking reaction.

The total amount of additives in the polyolefin composition according to the invention is generally 0.3 to 15 wt.-%, preferably 0.6 to 12 wt.-%, more preferably 1 to 10 wt.-%.

From the polymer composition of the present invention, a multilayered article can be prepared wherein at least one layer comprises said polymer composition. When cross-linking is initiated, a cross-linked multilayered article is obtained. Preferably, the multilayered article (either cross-linked or not) is a cable, preferably a power cable.

In the context of the present invention, a power cable is defined to be a cable transferring energy operating at any voltage. The voltage applied to the power cable can be alternating (AC), direct (DC), or transient (impulse).

In a preferred embodiment, the multilayered article is a power cable operating at voltages higher than 1 kV. In other preferred embodiments, the power cable prepared according to the present invention is operating at voltages higher than 6 kV.

Most preferably, the power cable prepared according to the present invention is designed for operating at voltages higher than 36 kV, and hence is a high or extra high voltage cable, due to the good voltage stabilising effect provided by the invention.

The power cable can be prepared in a process wherein the composition of the present invention, optionally in combination with a cross-linking agent, is applied onto a substrate by extrusion. In such an extrusion process, the sequence of mixing the components of the composition can be varied, as explained below.

According to a preferred embodiment, the polyolefin (A), optionally in combination with further polymer component(s), and the aromatic compound (B) are mixed with each other and possibly with further additives, either on solid pellets or powder of the different polymer components or by melt mixing, followed by forming pellets from the melt.

Subsequently, if used, the cross-linking agent, preferably a peroxide, and optionally a scorch retarder and/or a cross-linking booster are added to the pellets or powder in a second step. Alternatively, the scorch retarder and/or cross-linking booster could already be added in the first step, together with the additives. The final pellets are fed to the extruder, e.g. a cable extruder.

According to another preferred embodiment, instead of a two-step process, the polyolefin (A) and any further polymeric component of the composition, preferably in the form of pellets or powder, aromatic compound (B) and, optionally, the further additive(s), cross-linking agent, and/or scorch retarder, are added to a compounding extruder, single or twin screw. Preferably, the compounding extruder is operated under careful temperature control.

According to another preferred embodiment, a mix of component (B) with all other additives, i.e. including antioxidant (s) and cross-linking agent and optionally a scorch retarder and/or further additives such as a cross-linking booster, are added onto the pellets or powder made of the polyolefin (A).

According to another preferred embodiment, pellets made of the polyolefin (A) and aromatic compound (B), optionally further containing additional additives, are prepared in a first step, e.g. by melt mixing. These pellets, obtained from the melt mixing, are then fed into the cable extruder. Optionally, subsequently, cross-linking agent and optionally a scorch retarder and/or a cross-linking booster are either fed prior to the hopper, in the hopper or directly into the cable extruder. Alternatively, cross-linking agent and/or scorch retarder and/or cross-linking booster are already added to the pellets before feeding these pellets into the cable extruder.

According to another preferred embodiment, pellets made of the polyolefin (A) and any further polymeric components without any additional components are fed to the extruder. Subsequently, component (B) and optionally antioxidant(s), cross-linking agent and optionally a scorch retarder, optionally in combination further additives such as a cross-linking booster, are either fed in the hopper or directly fed into the polymeric melt within the cable extruder. The aromatic compound (B) could be added in this step instead, together with the antioxidant(s), cross-linking agent, scorch retarder and the other optional additives used. Alternatively, at least one of these components, i.e. cross-linking agent, scorch retarder, cross-linking booster, antioxidant(s), aromatic compound (B) or a mixture of these components is already added to the pellets before feeding these pellets into the cable extruder.

According to another preferred embodiment, the aromatic compound (B) can also be provided in a master batch which comprises at least a matrix polymer and the aromatic compound (B).

The master batch is then added to or mixed with the polyolefin (A) and possibly further polymer components and further processed in a known manner to produce an article, such as power cable.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

Compounding may be performed by any known compounding process, including extruding the final product with a screw extruder or a kneader.

The present invention furthermore relates to a wire or cable, comprising the polyolefin composition in any of the above described embodiments.

In a preferred embodiment, the invention relates to a medium, high or extra high voltage cable comprising one or more conductors in a cable core, an inner semiconducting layer, followed by an insulating layer, and then an outer semiconducting layer, wherein at least one of these layers, preferably the insulating layer, comprises the polyolefin composition as described above.

One or more of those layers may also be cross-linked.

In one preferred but not limiting embodiment the insulating layers for medium/high/extra high voltage power cables generally have a thickness of at least 2 mm and the thickness increases with increasing voltage the cable is designed for.

In addition to the semiconductive and insulating layers, further layers may be present in medium, high or extra high voltage cables, such as a metallic tape or wire shield, and, finally, outermost jacketing layer(s).

The invention relates furthermore to the use of the polyolefin composition in any of the above described embodiments for the production of a layer of a wire or cable, preferably of a layer, more preferably an insulating layer, of a medium, high or extra high voltage cable.

Still further, the present invention relates to a polyolefin composition comprising a voltage stabiliser compound and having a molar field stability of at least 2500 kV kg/(mm mol), preferably of at least 3800 kV kg/(mm mol), more preferably of at least 4000 kV kg/(mm mol), still more preferably at least 5000 kV kg/(mm mol), and most preferably at least 6500 kV kg/(mm mol), measured in the electrical tree testing method indicated below.

Preferred embodiments of this polyolefin composition are those comprising the above described components (A) and (B) in any of their above-described embodiments and amounts.

Finally, the invention relates to the use, as a voltage stabiliser in a polyolefin composition, of an aromatic compound comprising a, preferably consisting of the, structural unit according to the following formula (I):

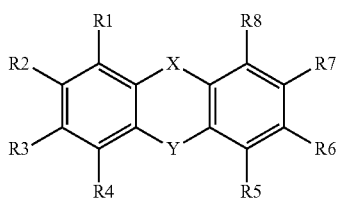
(I)

wherein
one or more of the C-atoms in the phenyl rings to which residue R1, R2, R3, R4, R5, R6, R7, or R8 is attached may also be a heteroatom, such as N, in which case the respective residue R1, R2, R3, R4, R5, R6, R7, or R8 is not present;

X either is no atom so that there is a direct bond between the two phenyl rings, or is =C(R11)-, —C(R11)$_2$-, —C(=Z)—, =N— or —N(R12)-, Y either is no atom so that there is a direct bond between the two phenyl rings, or is =C(R13)-, —C(R13)$_2$-, —C(=Z)—, =N— or —N(R14)-, Z is a divalent atom such as O, R1, R2, R3, R4, R5, R6, R7, R8 and, if present, R11, R12, R13 and R14 independently are hydrogen, or a hydrocarbyl group which may contain heteroatoms;

or at least two of said R1, R2, R3, R4, R5, R6, R7, R8 or, if present, R11, R12, R13 or R14, together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R8;

with the provisios that (i) at least one of said R1, R2, R3, R4, R5, R6, R7 or R8, or if present, at least one of said R1' to R8', is a hydrocarbyl group which may contain hetero atoms; and (ii) at least one of said R1, R2, R3, R4, R5, R6, R7 or R8, or, if present, said R1' to R8', R11, R12, R13 or R14, is a hydrocarbyl group which may contain heteroatoms and which has at least 6 non-H atoms;

(iii) if any of said R1, R2, R3, R4, R5, R6, R7 or R8, and, if present, any of said R1' to R8', R11, R12, R13 or R14 is a hydrocarbyl group which may contain hetero atoms, is attached to an aromatic ring of the compound according to formula (I), said hydrocarbyl group must be free of H-atoms in the alpha-position;

and/or an aromatic compound with a, preferably consisting of the, structural unit according to the following formula (II):

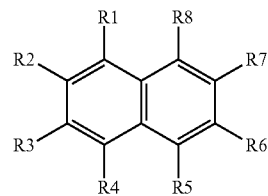
(II)

wherein
one or more of the C-atoms in the naphtyl rings to which residue R1, R2, R3, R4, R5, R6, R7, or R8 is attached may also be a trivalent heteroatom such as N, in which case the respective residue R1, R2, R3, R4, R5, R6, R7, or R8 is not present;

or at least two of said R1, R2, R3, R4, R5, R6, R7 or R8, together with the ring atoms of the ring system of formula (II) they are attached to, form a further aromatic or non-aromatic ring fused to the ring system of formula (II), and wherein the ring system of formula (II) with said at least one fused further ring may further bear one to eight substituents R1' to R8';

and R1, R2, R3, R4, R5, R6, R7 and R8, and, if present, said R1' to R8', have the same meaning and fulfil the same provisios as indicated for formula (I).

The following examples serve to further illustrate the present invention, by reference to the figures:

FIG. 1: Results of the electrical testing of the composition of Example 1.

Figure 2:
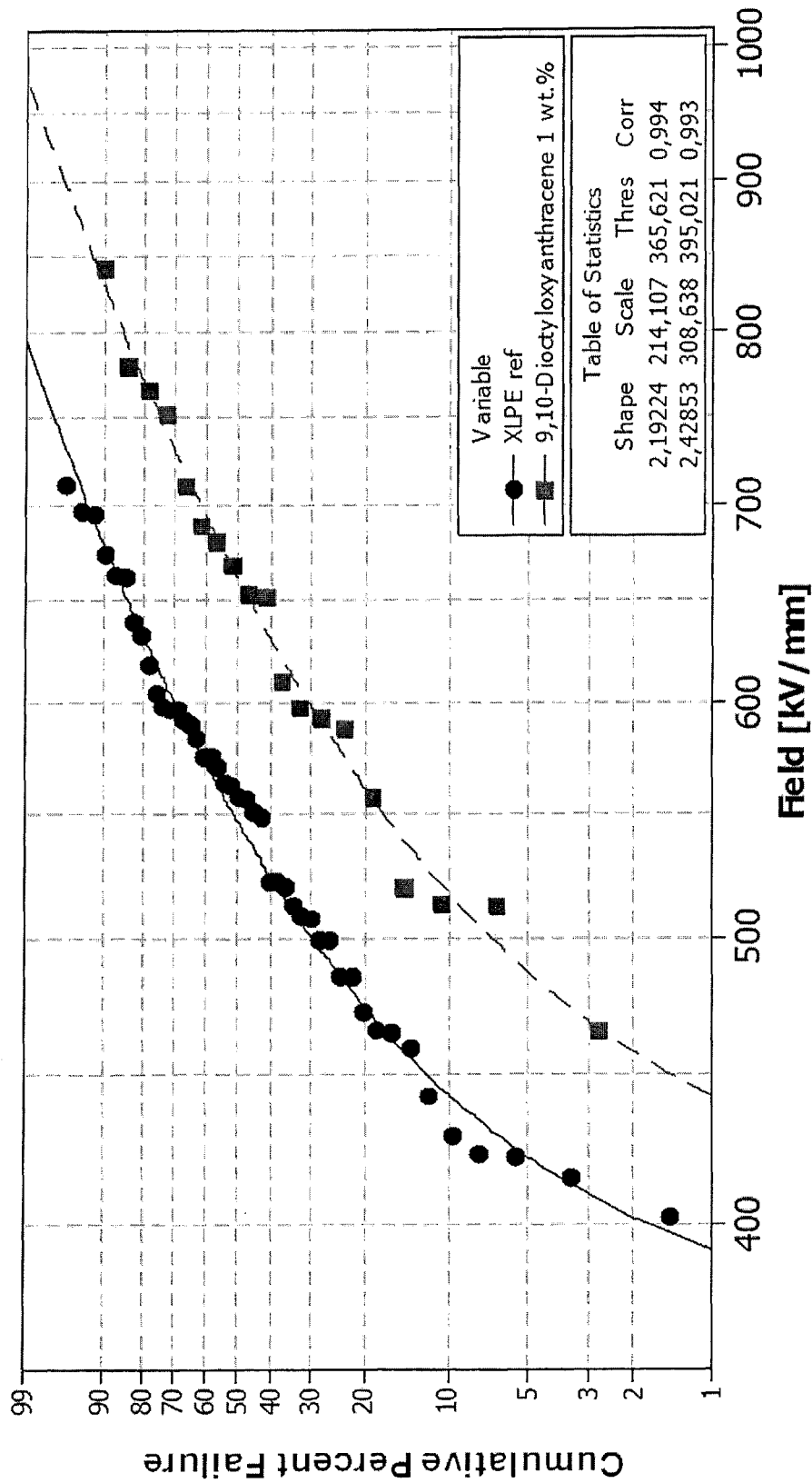

FIG. 2: Results of the electrical testing of the composition of Example 2.

Figure 3:
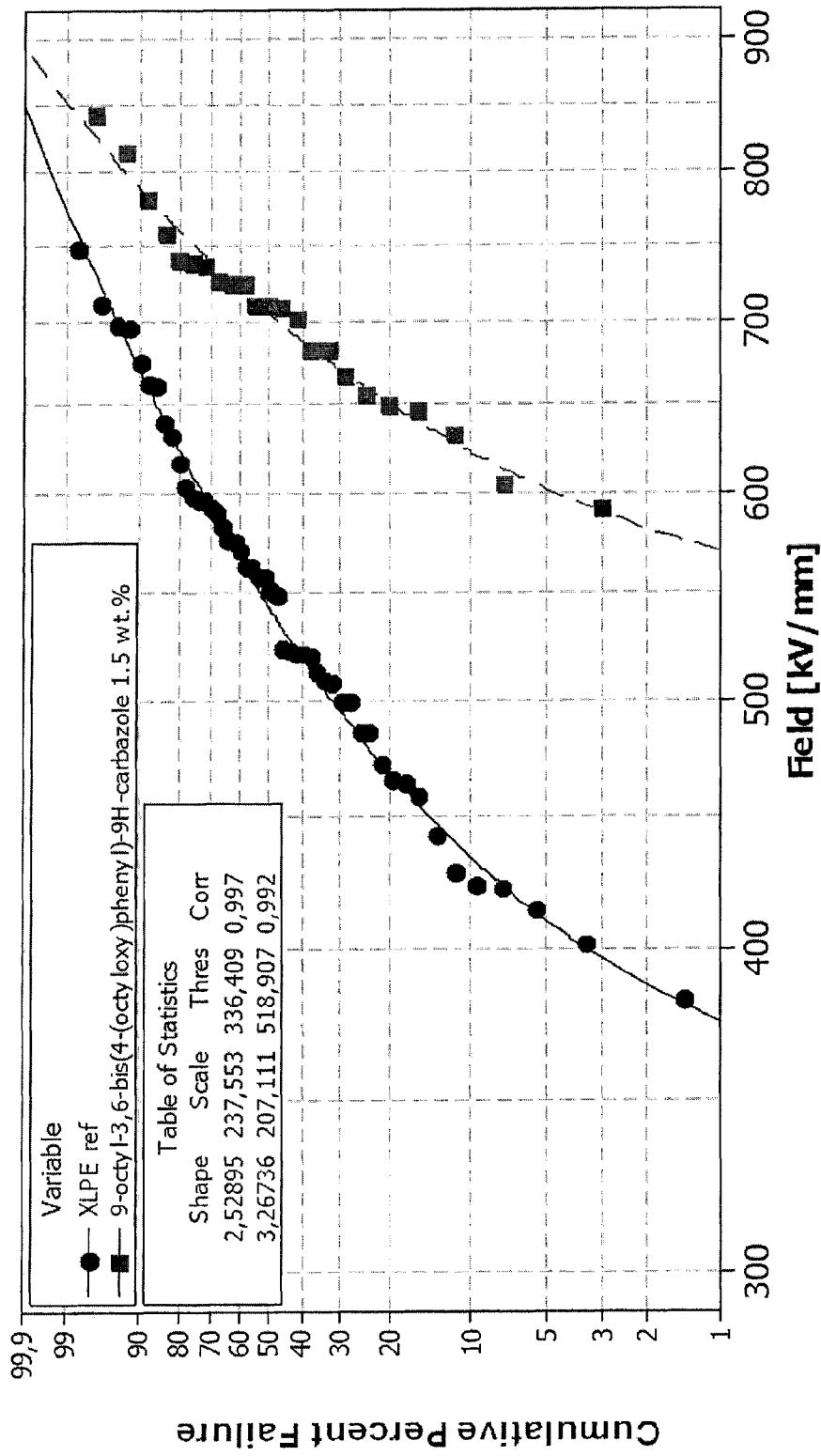

FIG. 3: Results of the electrical testing of the composition of Example 3.

Figure 4:
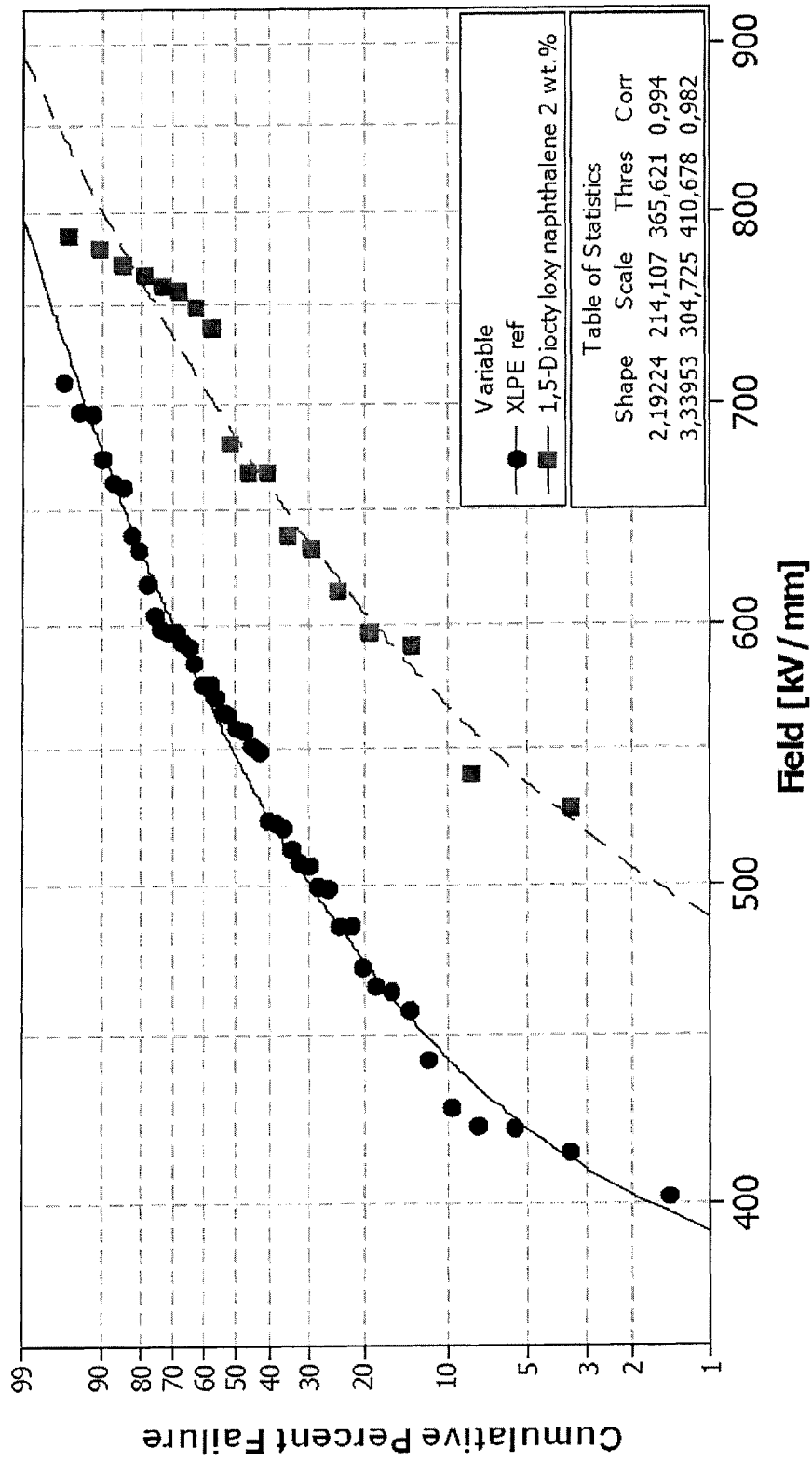

FIG. 4: Results of the electrical testing of the composition of Example 4.

Figure 5:
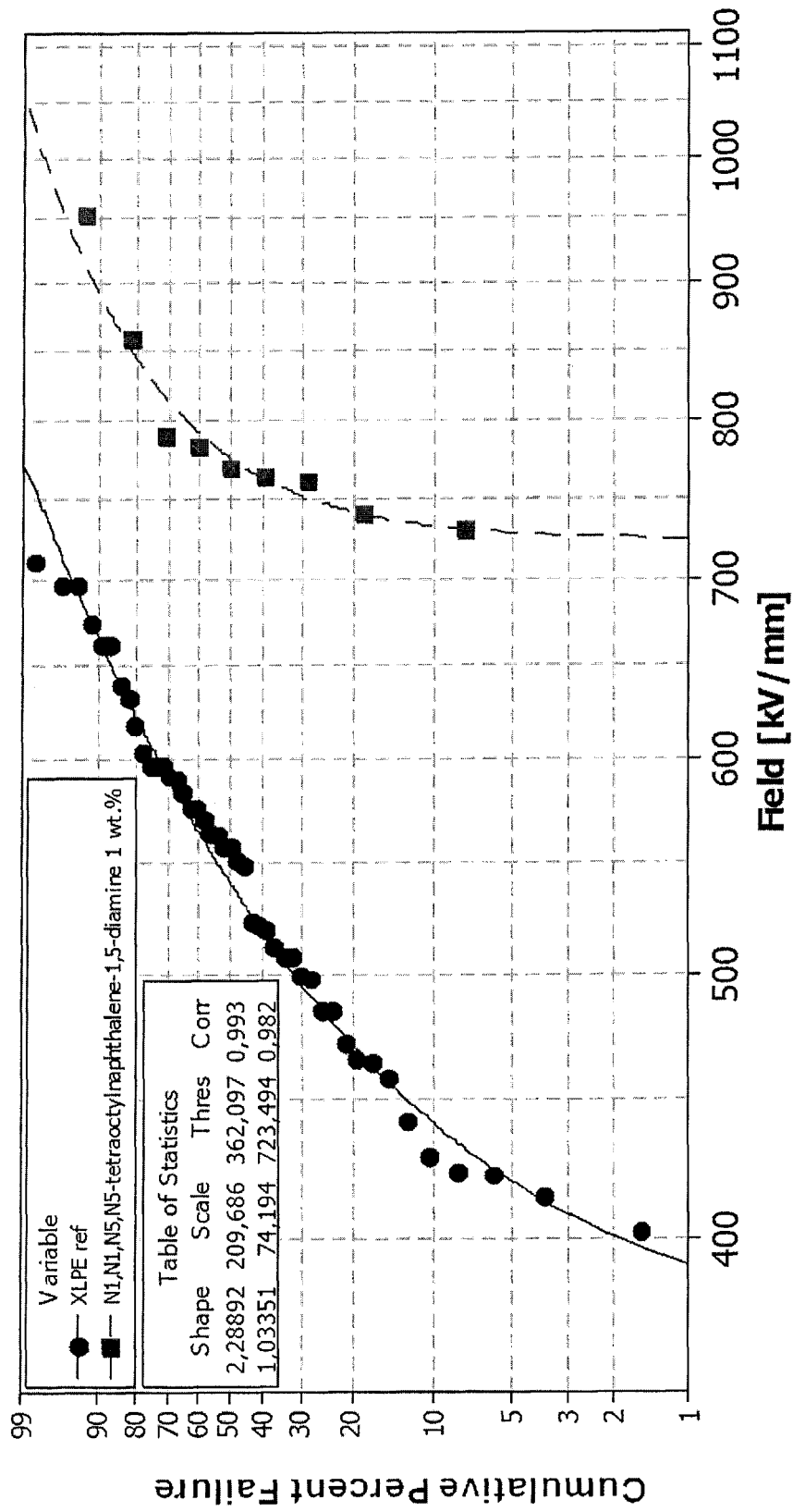

FIG. 5: Results of the electrical testing of the composition of Example 5.

Figure 6:
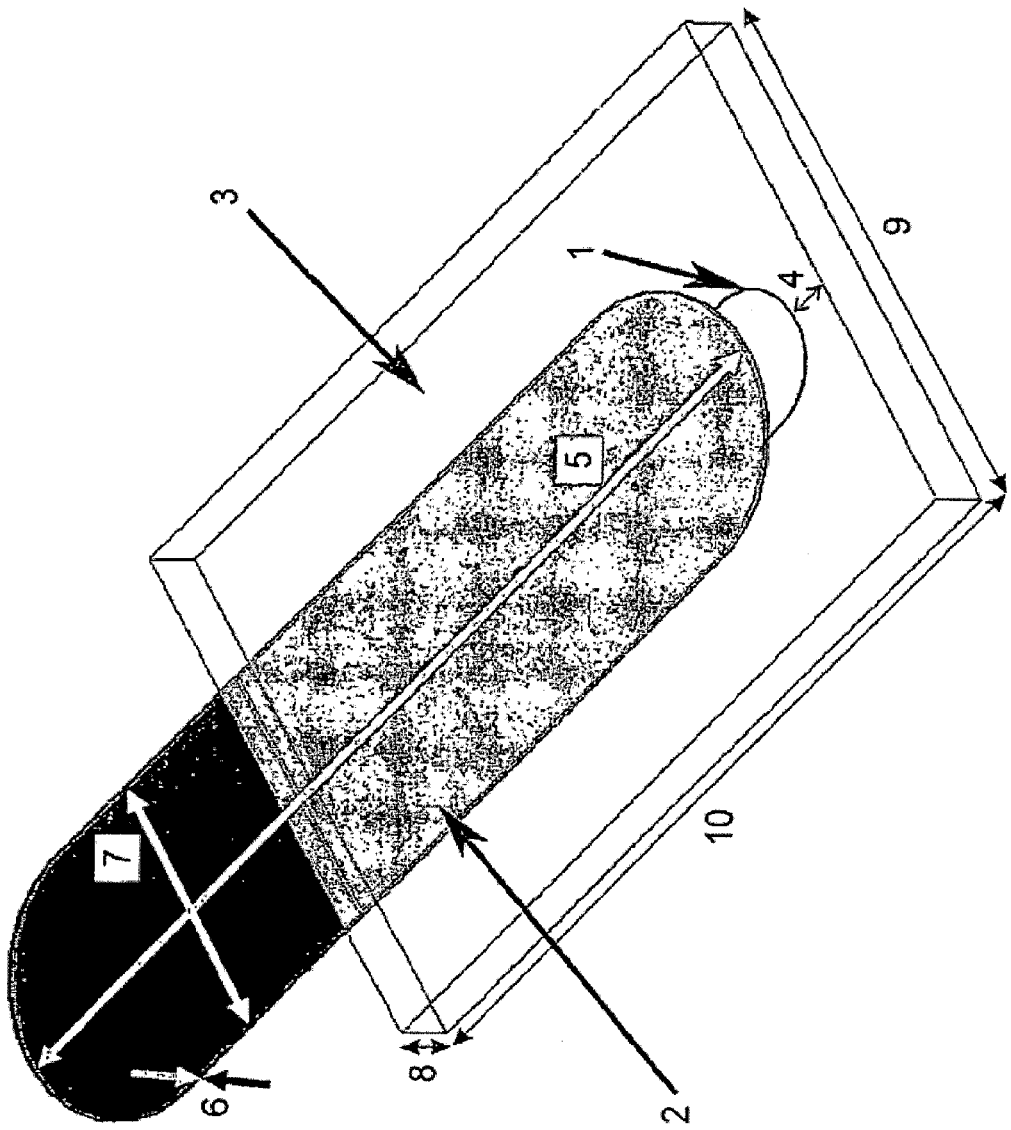

FIG. 6: The test object used in Examples 1-5 and Comparative Example 1.

EXAMPLES

1. Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg (MFR$_2$) or 21.6 kg (MFR$_{21}$). The MFR is determined at 230° C. for polypropylenes.

b) Determination of the Amount of Double Bonds

The procedure for the determination of the amount of double bonds/1000 C-atoms is based upon the ASTM D3124-72 method. In that method, a detailed description for the determination of vinylidene groups/1000 C-atoms is given based on 2,3-dimethyl-1,3-butadiene. The described sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene.

The molar absorptivity, B (in liters/(mole mm)) for each solution is usually calculated using the following equation:

$$B = \frac{1}{C \times L} \times A$$

where
C=concentration of the carbon-carbon double bond to be measured (mol/liters)
L=cell thickness (mm)
A=maximum absorbance (in our case the peak height) of the peak of the type of carbon-carbon double bond to be measured (mol/liters).

The amount of double bonds/1000 carbon atoms was calculated using the following formulas:

vinylidene/1000 C-atoms=(14×$A$)/(18.24×$L$×$D$)

where the molar absorptivitiy B is 18.24 calculated from the analyses of the solutions containing 2-methyl-1-heptene.

vinyl/1000 C-atoms=(14×$A$)/(13.13×$L$×$D$)

where the molar absorptivitiy B is 13.13 calculated from the analyses of the solutions containing 1-decene.

trans-vinylene/1000 C-atoms=(14×$A$)/(15.14×$L$×$D$)

where the molar absorptivitiy B is 15.14 calculated from the analyses of the solutions containing trans-4-decene.
wherein
A: absorbance (peak height)
L: film thickness in mm
D: density of the material (g/cm$^3$)
c) Determination of the Vinyl Content Originating from the Polyunsaturated Compound The number of vinyl groups originating from the polyunsaturated comonomer per 1000 carbon atoms was determined as follows:

Polymer to be determined with respect to vinyl groups originating form the polyunsaturated comonomer and the reference polymer which the same except without any added polyunsaturated comonomer are produced on the same reactor, basically using the same conditions, i.e. similar temperature and pressure. Then, it is assumed that the base level of vinyl groups, i.e. the ones formed by the process without the addition of chain transfer agent resulting in vinyl groups, is the same for both of the polymers. This base level is then subtracted from the measured numbers of vinyl groups in polymers, thereby resulting in the number of vinyl groups/1000 C-atoms, which result from the polyunsaturated comonomer.
d) Electrical Tree Testing The tree field is obtained by a wire-plane electrode configuration (R. Huuva, V. Englund, S. M. Gubanski, et al., "Development of New Test Set-up for Investigation of Electrical Tree Inception in Polyethylene," presented at Nordic Insulation Conference, Trondheim, 2005; "New Test Arrangements for Measuring Electrical Treeing Resistance in Polymers", Huva R., Chalmers University of Technology, ISSN: 1652-8891). The test object is then connected to an AC high voltage source prior to being submerged in transformer oil. The voltage is ramped with 0.5 kV/s until electrical treeing is achieved. The entire course of events is recorded with a CCD camera that allows both a visual real time analysis and a later computer analysis using the commercially available programme package Abobe Premiere Pro to determine the tree inception field. Testing is done at ambient temperature and humidity.

By applying a Kruskal Wallis test to the data sets, where cross-linked reference material and the same material with the different voltage stabilisers added, it is seen that the material with voltage stabiliser added were separated from the reference material to an extent ranging from 98.6 to 100%. This means that the two data sets are significantly separated.
e) Migration of Voltage Stabilisers Polyethylene samples were impregnated with the different voltage stabilizers dried and pressed into films. Molding scheme was; 6 minutes at 130° C., the first 3 minutes at 2 kN and the last 3 minutes at 200 kN before cooling to room temperature with sustained pressure during approximately 15 minutes. The formed films were approximately 150 μm thick.

Each of the films was cut into two strips 20×120 mm and was aged in an Elastocon EB01 cell oven at 90° C. with a constant airflow of 5 l/min. For the migration studies polyethylene without peroxide was used, so that no influence of peroxide decomposition products would influence the measurements.

The decrease of voltage stabiliser over time in the film strips was followed with FTIR (Fourier Transform Infrared) spectroscopy, measuring the transmission through the films. A peak at 1509 cm$^{-1}$ in the FTIR-spectra was attributed to the voltage stabiliser.

After transforming the transmission spectrum into absorbance, the peak at 1509 cm$^{-1}$ was normalized against the peak at 2016 cm$^{-1}$, which is attributed to a combination of Raman active twisting and infrared active rocking in both the amorphous and the crystalline phase (A. R. Wedgewood and J. C. Seferis, "Structural Characterization of Linear Polyethylene," *Pure and Applied Chemistry*, vol. 55, pp. 873-892, 1983).

This was done to set an internal standard and the peak height at 1509 cm$^{-1}$ could then be related to the content of voltage stabiliser in the polymer.
Density Density of the polymer was measured according to ISO 1183/D.

2. Compositions Produced and Tested a) Production of Voltage Stabilisers

Unless otherwise specified all the reagents are commercially available or can be produced according to methods well known in the literature.

Total synthesis of
9-octyl-3,6-bis(4-(octyloxy)phenyl)-carbazole of the invention Example 3

Synthesis of 3,6-dibromocarbazole according to [1]

Carbazole (15.0 g, 89.7 mmol) and silica (100 g) was mixed in dichloromethane and N-bromosuccinimide (33.0 g, 0.185 mol) dissolved in dichloromethane was added drop wise and the reaction was carried out for 3 h. The silica was filtered off, the filtrate quenched with water, and extracted three times with dichloromethane. The organic phase was then washed three times with water, evaporated, and the residual solid was recrystallised in ethanol to yield 3,6-dibromocarbazole (9.3 g, 28.6 mmol) as green crystals.

Synthesis of 1-bromo-4-(octyloxy)benzene 4-bromophenol (10.46 g, 60.5 mmol), 1-bromooctane (15.43 g, 79.9 mmol) and potassiumcarbonate (90 g, 0.65 mol) in N,N-dimethylformamide and was heated to 90° C. for 4 h and then the potassiumcarbonate was filtered off. The reaction mixture was quenched with water and extracted three times with ether. The ether was then washed three times with 1M hydrochloric acid (HCl), one time with water, evaporated, and purified by distillation to obtain 1-bromo-4-(octyloxy)benzene (15.1 g, 52.9 mmol) as a colourless oil.

Synthesis of 4-(octyloxy)phenylboronic acid 1-bromo-4-(octyloxy)benzene (14.64 g, 51.3 mmol) was dissolved in dry tetrahydrofuran in nitrogen atmosphere and cooled to −78° C. Butyllithium (50 ml, 80.0 mmol) was then added drop wise and the reaction mixture was let to room temperature. After an hour the mixture was once again cooled to −78° C. and triethylborate (23.6 g, 0.162 mol) was added drop wise. The reaction mixture was stirred over night at room temperature, acidified with 2M HCl, and the organic phase was recovered. It was washed once with water and three times with 1M sodium hydroxide to form a white soapy solid. The combined alkaline phases were acidified with 2M HCl and extracted with ether three times. The combined ether phases were washed with water and dried over magnesium sulphate. The product precipitated in dichloromethane from the reduced ether phase to yield 4-(octyloxy)phenylboronic acid (7.15 g, 28.6 mmol) as a white solid.

Synthesis of 3,6-bis(4-(octyloxy)phenyl)-carbazole according to [2]

3,6-dibromocarbazole (3.03 g, 9.32 mmol), 4-(octyloxy)phenylboronic acid (7.14 g, 28.5 mmol), aqueous NaHCO$_3$ (80 ml), ethanol (120 ml) and toluene (190 ml) was mixed and degassed with nitrogen for 15 minutes before adding the Pd(PPh$_3$)$_4$ catalyst (80 mg, 0.07 mmol). The reaction mixture was then brought to reflux at 90° C. for 5 h 20 minutes. It was quenched with water when reached room temperature and extracted three times with ethyl acetate. The combined organic phases were washed with brine and water and evaporated. The residual solid was dissolved in toluene and precipitated in petroleum ether. The precipitate was purified using column chromatography with toluene as mobile phase which yielded 3,6-bis(4-(octyloxy)phenyl)-carbazole (5.42 g, 9.41 mmol) as a white solid.

Synthesis of 9-octyl-3,6-bis(4-(octyloxy)phenyl)-carbazole according to [3]

3,6-bis(4-(octyloxy)phenyl)-carbazole (4.2 g, 7.29 mmol), 1-bromooctane (4.25 g, 22.0 mmol) and tetrabutylammoniumhydrogensulphate (0.64 g, 1.88 mmol) was dissolved in toluene and mixed with NaOH 50% aqueous solution (5.5 ml). The reaction was quenched after 4 h, extracted three times with ether, and the combined organic phases was washed with water, evaporated, and purified using column chromatography with a 5/2 petroleum ether/toluene mixture as mobile phase. The product was obtained as colourless oil which crystallized to give 9-octyl-3,6-bis(4-(octyloxy)phenyl)-carbazole (1.34 g, 1.95 mmol) as white crystals. $^1$H-NMR(C$_2$D$_2$Cl$_4$, δ): 0.7-0.9 (m, 9H), 1.15-1.45 (m, 30H), 1.758 (m, 4H), 1.848 (m, 2H), 3.957 (t, 4H), 4.251 (t, 2H), 6.951 (d, 4H), 7.389 (d, 2H), 7.61 (m, 6H) 8.23 (s, 2H) MS MALDI-TOF (m/z): 687.461

Synthesis of 1,4-bis(octyloxy)anthracene-9,10-dione of the invention 1,4-dihydroxyanthracene-9,10-dione (5.0 g, 20.6 mmol), 1-bromooctane (10.0 g, 51.8 mmol), and potassium carbonate (37 g, 0.268 mol) was mixed in N,N-dimethylformamide and heated at 90° C. for 7 h after which the potassium carbonate was filtered off. The reaction mixture was quenched with water and extracted three times with ether. The ether was then washed three times with 1M HCl, one time with water, and evaporated to give a dark yellow solid. This solid was recrystallised in methanol to yield 1,4-bis(octyloxy)anthracene-9,10-dione (1.81 g, 3.88 mmol) as a yellow solid. $^1$H-NMR (CDCl$_3$, δ): 0.89 (t, 6H), 1.2-1.4 (m, 16H), 1.53 (m, 4H), 1.93 (m, 4H), 4.10 (t, 4H), 7.30 (s, 2H), 7.71 (m, 2H), 8.16 (m, 2H) MS MALDI-TOF (m/z): 464.328

Synthesis of N1,N1,N5,N5-tetraoctylnaphthalene-1,5-diamine according to [4] of the invention Example 5

Naphthalene-1,5-diamine (3.14 g, 19.8 mmol), 1-bromooctane (25.25 g, 0.130 mol), potassium carbonate (11.79 g, 85.3 mmol), and potassium iodide (0.05 g, 0.30 mmol) was stirred in dry butanol (150 ml) and heated to 110° C. for 36 h. The reaction was quenched with water and extracted with ether three times. The combined organic phase was washed three times with water and evaporated to give black oil which was distilled under reduced pressure at 90° C. to yield a black tar. This was purified with flash chromatography using hexane as mobile phase to obtain colourless oil which crystalised to yield N1,N1,N5,N5-tetraoctylnaphthalene-1,5-diamine (2.3 g, 3.79 mmol) as white crystals. $^1$H-NMR (CDCl$_3$, δ): 0.85 (t, 12H), 1.0-1.4 (m, 40H), 1.4-1.6 (m, 8H), 3.08 (t, 8H), 7.1 (d, 2H), 7.35 (t, 2H), 8.01 (d, 2H) MS MALDI-TOF (m/z): 606.574

Synthesis of 1,5-bis(octyloxy)naphthalene of the invention

Example 4

1,5-dihydroxynaphthalene (2.95 g, 18.4 mmol), 1-bromooctane (8.2 g, 42.5 mmol), and potassium carbonate (50 g, 0.36 mol) was mixed in N,N-dimethylformamide and heated at 90° C. for 5 h. The potassium carbonate was filtered off and the reaction mixture was quenched with water and extracted two times with ether. The combined organic phase was then washed once with 1M HCl, two times with water, and evaporated. The residual brown solid was recrystallised in ethanol to form 1,5-bis(octyloxy)naphthalene (4.96 g, 12.9 mmol) as brown crystals. $^1$H-NMR (CDCl$_3$, δ): 0.89 (t, 6H), 1.2-1.4 (m, 16H), 1.4-1.6 (m, 4H), 1.91 (m, 4H), 4.12 (t, 4H), 6.81 (d, 2H), 7.34 (t, 2H), 7.83 (d, 2H) MS MALDI-TOF (m/z): 384.266

Synthesis of 9,10-dioctyloxyanthracene according to [5] of the invention

Example 2

To nitrogen saturated water (100 ml) and dichloromethane (100 ml) 9,10-anthraquinone (2.02 g, 9.61 mmol), sodium dithionite (3.39 g, 19.5 mmol), and Adogen 464 (3.5 g) was added. This was stirred for 5 minutes before addition of sodium hydroxide (3.8 g, 95.0 mmol). The reaction mixture was stirred for an additional 10 min and when it turned deep red 1-iodooctane (11.5 g, 47.9 mmol) was added drop wise. The reaction was stirred at room temperature under nitrogen atmosphere over night. The phases were separated and the water phase was extracted two times with dichloromethane and then the combined organic phases were washed two times with water and evaporated to obtain oil with crystals. These were recrystallised in ethanol and removed as starting material. After two crops the ethanol solution was cooled and the ensuing yellow crystals was purified by column chromatography using dichloromethane as mobile phase to yield 9,10-dioctyloxyanthracene (1.3 g, 2.99 mmol) as a white solid. $^1$H NMR (CDCl$_3$, δ): 0.91 (t, 6H), 1.2-1.45 (m, 16H), 1.64 (m, 4H), 2.04 (m, 4H), 4.16 (t, 4H), 7.46 (m, 4H), 8.28 (m, 4H) MS MALDI-TOF (m/z): 434.247

Synthesis of 4-methoxy-9-(octyloxy)acridine of the invention

Example 1

4-methoxyacridin-9-ol (2.0 g, 8.88 mmol), 1-bromooctane (2.17 g, 11.24 mmol), and potassium carbonate (7.91 g, 57.2 mmol) was mixed in N,N-dimethylformamide and heated at 120° C. for 8 h and the potassium carbonate was filtered off. The reaction mixture was quenched with water and extracted two times with ether and the combined organic phases was then washed once with 1M HCl, two times with water, and evaporated to obtain a yellow solid. The solid was recrystallised in methanol to give 4-methoxy-9-(octyloxy)acridine (0.95 g, 2.82 mmol) as yellow crystals. $^1$H-NMR (CDCl$_3$, δ): 0.881 (t, 3H), 1.2-1.4 (m, 10H), 1.924 (m, 2H), 3.985 (s, 3H), 4.507 (t, 2H), 7.2-7.3 (m, 3H), 7.621 (d, 1H), 7.707 (m, 1H), 8.181 (m, 1H), 8.498 (m, 1H) MS MALDI-TOF (m/z): 337.146

[1] Smith, Keith, D. M. James, A. G. Mistry, et al., "A new method for bromination of carbazoles, [beta]-carbolines and iminodibenzyls by use of N-bromosuccinimide and silica gel," Tetrahedron, vol. 48, pp. 7479-7488, 1992.

[2] U. Jacquemard, S. Routier, A. Tatibouet, et al., "Synthesis of diphenylcarbazoles as cytotoxic DNA binding agents," Organic & Biomolecular Chemistry, vol. 2, pp. 1476-1483, 2004.

[3] X. Li, E. A. Mintz, X. R. Bu, et al., "Phase Transfer Catalysis for Tandem Alkylation of Azo Dyes for the Synthesis of Novel Multifunctional Molecules," Tetrahedron, vol. 56, pp. 5785-5791, 2000.

[4] C. Maertens, Z. Jian-Xin, P. Dubois, et al., "Synthesis and characterization of end-functionalized oligo-(vinylthiophenes) with liquid crystal properties," J. Chem. Soc., Perkin Trans. 2, vol. 4, pp. 713-718, 1996.

[5] C. L. Michael Diekers, Dirk M. Guldi, Andreas Hirsch, "Th-Symmetrical Hexakisadducts of C60 with a Densely Packed pi-Donor Shell Can Act as Energy- or Electron-Transducing Systems," Chemistry—A European Journal, vol. 8, pp. 979-991, 2002.

b) Production and Testing of Compositions

Several compositions including voltage stabilisers for the preparation of insulating layers were prepared and tested together with a reference polymer without stabiliser according to the following procedures:

Material and Test Set Up for Electrical Tree Testing

In each test for general definitions and for examples of this application the test arrangement for the reference polymer, i.e. the polymer without the voltage stabilising compounds to be tested, and for the tested compositions, i.e. the reference polymer containing the voltage stabilising compounds, was the same.

A commercially available cross-linkable low density polyethylene (LDPE) with a grade name, Supercure™ LS4201S, supplied by Borealis, Sweden, which was prepared by high pressure polymerisation and had a density of 0.922 g/cm3 (ISO1872-2/ISO1183-2), MFR2 (ISO 1133, load 2.16 kg, at 190° C.) of 2 g/10 min was used as the polymer for preparing the compositions to be tested, and also as the reference polymer.

The reference polymer was in a form of pellets which contained dicumyl peroxide as a cross-linking agent. The electrode support was made of cross-linked semi-conducting polyethylene. The electrode used was a 10 micrometer tungsten wire supplied by Luma Metall AB.

Sample Preparation for Electrical Tree Testing

Impregnation

The reference polymer pellets for electrical tree testing were ground to a fine powder in a Retsch grinder with a 500 micrometer sieve. For the preparation of the compositions according to the invention (Examples 1 to 5) and the preparation of the comparative composition (Comparative Example 1), the powder obtained was impregnated with the respective test voltage stabiliser in a diethyl ether solution for one hour while agitated every 15 minutes. The diethyl ether was then removed by means of rotary evaporation and vacuum oven to obtain a dry powder with a homogeneously distributed voltage stabiliser.

The following compounds were used in the tested compositions as voltage stabilisers in the indicated amounts based on the total composition.

Example 1: 4-methoxy-9-(octyloxy)acridine 0.76 wt.-%
Example 2: 9,10-dioctyloxyanthracene 1 wt.-%
Example 3: 9-octyl-3,6-bis(4-(octyloxy)phenyl)-carbazole 1.5 wt.-%
Example 4: 1,5-dioctyloxynaphthalene 2 wt.-%
Example 5: N1,N1,N5,N5-tetraoctylnaphthalene-1,5-diamine 1 wt.-%
Comparative Example 1: N-octyl-carbazole 2 wt.-%

Preparation of Test Objects

The test object used here is shown in FIG. 6. It is comprised of a 10 micrometer tungsten (1) wire sawn to an electrode support (2) made of cross-linked semi-conducting polyethylene. This is moulded between two plaques of the compositions or the reference material to be tested. These plaques are subsequently cross-linked. As moulding machine TP200 from Fontijne was used.

The dimensions, molding and cross-linking of the plaques are as follows: The electrode support (2) has a length (5) of 40 mm, a thickness (6) of 0.2 mm and a width (7) of with both ends rounded at a radius of 5 mm. The wire is sawn to make a loop where the high and divergent field is produced. The electrode and its support are moulded between two plaques of cross-linkable polyethylene, with or without an addition of voltage stabiliser using a two piece mould which holds the electrode support in place during the whole molding process. The test objects are made in batches of 10.

The molding scheme for the plaques is 6 minutes at 130° C., the first 3 minutes at 2 kN and the last 3 minutes at 200 kN before cooling to room temperature with sustained pressure during approximately 15 minutes. The molding/cross-linking cycle of the test objects starts at 2 kN for 3 minutes and goes from 2 kN to 200 kN over 18 minutes with and load increase rate of 11 kN/min and is withheld at 200 kN for the rest of the duration of the molding/cross-linking cycle. During the molding cycle the temperature is set at 130° C. at the beginning of the cycle and at this temperature for the first six minutes after which it increases to 180° C. during 15 minutes with a temperature increase rate of 3.3° C./min and stays at 180° C. for 15 minutes for completing the cross-linking of the moulded plaques before descending to room temperature over a period of approximately 30 minutes. The insulation part of the test object (3) has a thickness (8) of 1.6 mm a width (9) of 20 mm and a length of (10) ofapprox. 30 mm after cutting depending on the wire loop. The distance (4) of the wire loop electrode to the end of the insulation part of the test object is 3 mm.

c) Results

1. Electrical Tree Testing

The compositions prepared as well as the reference polymer were subjected to the electrical tree testing as described above to obtain values for their Molar Field Stability (MFS).

Molar Field Stability is a way to describe the efficiency of a voltage stabiliser with reference to the material in which it is added. The efficiency is the combined increase of the threshold and scale parameter taken from the 3 parameter Weibull statistics (Advanced Power Cable Technology, Tanaka T., Greenwood A., CRC Press Inc., 2000, ISBN: 0-8493-5166-9) correlated to the concentration of added voltage stabiliser and can be described as follows:

MFS=((Threshold+Scaleparameter)$_{VoltageStabiliser}$−(Threshold+Scaleparameter)$_{Reference}$)/(mole$_{VoltageStabiliser}$/kg$_{Polymer}$)

This is also applicable when using 2 parameter Weibull statistics where the scale parameter is used, leading to the expression:

MFS=(Scaleparameter$_{VoltageStabiliser}$−Scaleparameter$_{Reference}$)/(mole$_{VoltageStabiliser}$/kg$_{Polymer}$)

In the above equations the subscript "voltage stabiliser" indicates that the parameter was obtained from a sample in which the reference polymer has been impregnated with the respective voltage stabiliser, i.e. from one of the tested compositions, whereas the subscript "reference" indicates that the parameter was obtained from a sample of the reference polymer not including a voltage stabiliser.

Molar Field Stability is a modification of Molar Voltage Stability which has been used when using double needle setups where a characteristic voltage usually was obtained. A detailed description of the molar voltage stability can be found in Chen, C. Ku and Raimond Liepins, Electrical Properties of Polymers, Chapter 4.7 Inhibition of Electrical Treeing, Carl Hanser Verlag Munich, 1987 (ISBN: 3-446-14280-0).

The values for the Molar Field Stability obtained are given in Table 1:

TABLE 1

| Example | Molar Field Stability kV kg/(mm mol) |
|---|---|
| Example 1 | 4220 |
| Example 2 | 5340 |

TABLE 1-continued

| Example | Molar Field Stability kV kg/(mm mol) |
|---|---|
| Example 3 | 6760 |
| Example 4 | 2580 |
| Example 5 | >10000 |
| Comparative Example 1 | 1247 |

2. Migration Testing

The voltage stabiliser tested was the 1,5-dialkoxy naphthalene with varying length of the alkoxy chain —OC$_4$H$_9$, —OC$_8$H$_{17}$ (Example 4) and —OC$_{16}$H$_{33}$ added with 2.02 wt.-%, 2.08 wt.-% and 2.58 wt.-%, respectively, to show the migration properties. Different amounts in wt.-% were used in order to obtain a consistent molar amount.

Table 2 is showing residual concentration as % of initial quantity of voltage stabiliser as a mean value from two different filmstrips.

TABLE 2

| Days | 1 | 4 | 6 | 18 | 40 |
|---|---|---|---|---|---|
| 1,5-dibutoxynaphthalene | 68.9 | 17.0 | 7.6 | 1.1 | 1.0 |
| 1,5-dioctyloxynaphthalene | 86.5 | 89.2 | 86.3 | 85.9 | 81.8 |
| 1,5-dihexadecyloxynaphthalene | 82.2 | 82.4 | 84.6 | 80.3 | 78.4 |

The invention claimed is:

1. A cable comprising a layer made of a polyolefin composition comprising:
   (i) a polyolefin (A); and
   (ii) an aromatic compound (B) which is an anthracene derivative having the following structural unit according to the following Formula (I.A):

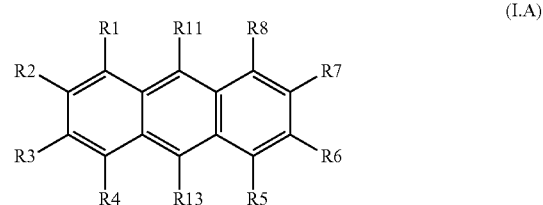

(I.A)

wherein, in Formula (I.A):
   R1, R2, R3, R4, R5, R6, R7, R8, R11, and R13 are independently hydrogen or a hydrocarbyl group optionally containing heteroatoms selected from the group consisting of Si, N, P, O and S;
   or at least two adjacent substituents selected from the group consisting of R1, R2, R3, R4, R5, R6, R7, R8, R11, and R13, together with the carbon atoms of the ring system of formula (I.A) to which the substituents are attached, form a further aromatic or non-aromatic ring fused to the ring system of formula (I.A), and wherein the further aromatic or non-aromatic ring is optionally substituted with 1 to 8 substituents R1' to R8', independently selected from hydrogen or a hydrocarbyl group optionally containing heteroatoms selected from the group consisting of Si, N, P, O and S;
   or one or more carbons which form the aromatic ring of Formula (IA) is heteroatom, N, and the corresponding R group is absent;

with the provisos that:
  (a) at least one of said R1, R2, R3, R4, R5, R6, R7, R8, R11 or R13 or, if present, R1' to R8' is selected from the groups of —O(R9) and —NR(R10)2, wherein R9 and R10 are alkyl groups with at least 6 C-atoms which may or may not contain a functional group at the end which, if present, is a —CH═CH2, a halogen, a hydroxyl, a carboxylic acid or acid halide group; and
  (b) if any of R1, R2, R3, R4, R5, R6, R7, R8, R11 or R13 or, if present, any of R1' to R8' is a hydrocarbyl group optionally containing heteroatoms selected from the group consisting of Si, N, P, O and S, and is attached to an aromatic ring of the compound according to Formula (I.A), said hydrocarbyl group lacks H-atoms in the alpha-position.

2. The cable of claim 1, wherein the aromatic compound (B) is 9,10-dioctyloxyanthracene.

3. The cable of claim 1, wherein the polyolefin (A) comprises a polyethylene or polypropylene.

4. The cable of claim 1, wherein the polyolefin (A) comprises a polyethylene which has been produced by a high pressure process using free radical polymerization resulting in low density polyethylene (LDPE).

5. The cable of claim 1, wherein the layer made of the polyolefin composition is an insulation layer.

6. A medium, high or extra high voltage cable comprising one or more conductors in a cable core, an inner semiconductive layer, followed by an insulation layer and then an outer semiconductive layer, wherein at least one of these layers comprises a polyolefin composition comprising:
  (i) a polyolefin (A); and
  (ii) an aromatic compound (B) which is an anthracene derivative having the following structural unit according to the following Formula (I.A):

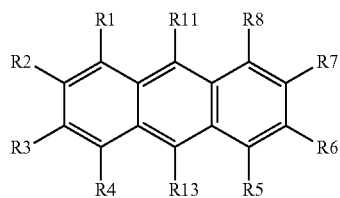

(I.A)

wherein, in Formula (I.A):
  R1, R2, R3, R4, R5, R6, R7, R8, R11, and R13 are independently hydrogen or a hydrocarbyl group optionally containing heteroatoms selected from the group consisting of Si, N, P, O and S;
  or at least two adjacent substituents selected from the group consisting of R1, R2, R3, R4, R5, R6, R7, R8, R11, and R13, together with the carbon atoms of the ring system of formula (I.A) to which the substituents are attached, form a further aromatic or non-aromatic ring fused to the ring system of formula (I.A), and wherein the further aromatic or non-aromatic ring is optionally substituted with 1 to 8 substituents R1' to R8', independently selected from hydrogen or a hydrocarbyl group optionally containing heteroatoms selected from the group consisting of Si, N, P, O and S;
  or one or more carbons which form the aromatic ring of Formula heteroatom, N, and the corresponding R group is absent;
with the provisos that:
  (a) at least one of said R1, R2, R3, R4, R5, R6, R7, R8, R11 or R13 or, if present, R1' to R8' is selected from the groups of —O(R9) and —NR(R10)2, wherein R9 and R10 are alkyl groups with at least 6 C-atoms which may or may not contain a functional group at the end which, if present, is a —CH═CH2, a halogen, a hydroxyl, a carboxylic acid or acid halide group; and
  (b) if any of R1, R2, R3, R4, R5, R6, R7, R8, R11 or R13 or, if present, any of R1' to R8' is a hydrocarbyl group optionally containing heteroatoms selected from the group consisting of Si, N, P, O and S, and is attached to an aromatic ring of the compound according to Formula (I.A), said hydrocarbyl group lacks H-atoms in the alpha-position.

7. The cable of claim 6, wherein the aromatic compound (B) is 9,10-dioctyloxyanthracene.

8. The cable of claim 6, wherein the polyolefin (A) comprises a polyethylene or polypropylene.

9. The cable of claim 6, wherein the polyolefin (A) comprises a polyethylene which has been produced by a high pressure process using free radical polymerization resulting in low density polyethylene (LDPE).

10. The cable of claim 6, wherein the insulation layer comprises the polyolefin composition.

\* \* \* \* \*